(12) United States Patent
Mogami et al.

(10) Patent No.: US 6,596,782 B1
(45) Date of Patent: Jul. 22, 2003

(54) HYDROUS POLYOLEFIN RESIN COMPOSITION, PREEXPANDED PARTICLES PRODUCED THEREFROM, PROCESS FOR PRODUCING THE SAME, AND EXPANDED MOLDING

(75) Inventors: Kenji Mogami, Settsu (JP); Tsuyoshi Mihayashi, Akashi (JP); Kyoichi Nakamura, Takasago (JP); Naruhiko Akamatsu, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/155,544

(22) PCT Filed: Apr. 1, 1997

(86) PCT No.: PCT/JP97/01119
§ 371 (c)(1),
(2), (4) Date: Sep. 25, 1998

(87) PCT Pub. No.: WO97/38048
PCT Pub. Date: Oct. 16, 1997

(30) Foreign Application Priority Data

Apr. 5, 1996 (JP) .............................. 8-084124
Oct. 4, 1996 (JP) .............................. 8-264726

(51) Int. Cl.[7] .................................. C08J 9/16
(52) U.S. Cl. ............................ 521/59; 521/56; 521/58; 521/60; 524/425; 524/427; 524/451; 524/506; 524/515
(58) Field of Search ................................ 524/493, 494, 524/451, 513, 506, 425, 427; 521/56, 58, 59, 60

(56) References Cited

U.S. PATENT DOCUMENTS

| | | | | |
|---|---|---|---|---|
| 3,770,663 A | * | 11/1973 | Ueki et al. | 260/2.5 B |
| 4,422,877 A | * | 12/1983 | Spitzer et al. | |
| 4,506,037 A | * | 3/1985 | Suzuki et al. | 521/82 |
| 4,676,939 A | * | 6/1987 | Kuwabara et al. | 264/50 |
| 4,689,351 A | * | 8/1987 | Endo et al. | 521/60 |
| 5,693,424 A | | 12/1997 | Watanabe et al. | 428/474.7 |

FOREIGN PATENT DOCUMENTS

| | | |
|---|---|---|
| DE | 4235747 | 6/1994 |
| EP | 409788 | 1/1991 |
| EP | 0 464 788 | 1/1992 |
| EP | 524404 | 1/1993 |
| EP | 693528 | 1/1996 |
| JP | 49-2183 | 1/1974 |
| JP | 52-77174 | 6/1977 |
| JP | 57170725 | 10/1982 |
| JP | 5862024 | 4/1983 |
| JP | 60-188435 | 9/1985 |
| JP | 60-221440 | 11/1985 |
| JP | 61-4738 | 1/1986 |
| JP | 62-115042 | * 5/1987 |
| JP | 4331247 | 11/1992 |

* cited by examiner

*Primary Examiner*—Judy M. Reddick
(74) *Attorney, Agent, or Firm*—Leydig, Voit & Mayer, Ltd.

(57) ABSTRACT

A water-containing polyolefin resin composition containing a polyolefin resin and a hydrophilic polymer and having a water content of 1 to 50% by weight which is suitable for use in preparation of polyolefin resin pre-expanded particles, and pre-expanded particles of a polyolefin resin prepared by pre-expanding the water-containing polyolefin resin composition the particles having a an apparent expansion ratio of 5 to 60, a closed cell ratio of 80 to 100% and an average cell diameter of 50 to 500 $\mu$m. The pre-expanded particles can be prepared without using a volatile blowing agent by dispersing resin particles made of a polyolefin resin composition containing a polyolefin resin and a hydrophilic polymer into an aqueous dispersion medium in a closed vessel to form a dispersion, heating to a temperature not lower than the softening point of the polyolefin resin to produce water-containing resin particles having a water content of 1 to 50% by weight, and releasing the aqueous dispersion from the closed vessel into a lower pressure than the inner pressure of the closed vessel, thereby expanding the water-containing resin particles. When the releasing of the dispersion from the vessel is conducted after raising the inner pressure to 25 to 75 $kg/cm^2 G$ by introducing nitrogen gas, air or an inorganic gas including them as a main component into the vessel, pre-expanded particles providing foams having good physical properties and a high expansion ratio are obtained.

12 Claims, No Drawings

HYDROUS POLYOLEFIN RESIN COMPOSITION, PREEXPANDED PARTICLES PRODUCED THEREFROM, PROCESS FOR PRODUCING THE SAME, AND EXPANDED MOLDING

TECHNICAL FIELD

The present invention relates to a water-containing polyolefin resin composition, pre-expanded particles made thereof, a process for preparing the pre-expanded particles and a cellular molded article. More particularly, the present invention relates to polyolefin resin pre-expanded particles which can be suitably used, for example, as a raw material for in-mold foamed articles and a process for the preparation thereof, a water-containing polyolefin resin composition which can be suitably used for preparing the pre-expanded particles, and a cellular molded article obtained from the pre-expanded particles.

BACKGROUND ART

In general, polyolefin pre-expanded particles are prepared by a method in which polyolefin resin particles containing a volatile organic blowing agent are dispersed in an aqueous medium, in a vessel and heated to a temperature not lower than the softening point of the resin while maintaining a pressure in the vessel at vapor pressure of the blowing agent or above, and the dispersion is released into an atmosphere of lower pressure than the pressure in the vessel, thereby expanding the particles (see Japanese Patent Publication Kokai No. 52-77174). As the volatile organic blowing agent, hydrocarbons such as propane, butane, pentane, trichlorofluoromethane, dichlorodifluoromethane and the like are used. However, since this method uses the volatile blowing agent, it has the defect of higher cost. In addition, the use of butane and fluorohydrocarbons is not preferable from an environmental point of view.

Therefore, there has been recently a need for development of a method which can prepare polyolefin resin pre-expanded particles having desired physical properties without using volatile blowing agents which have been required.

Japanese Patent Publication Kokai No. 61-4738 discloses a method in which polypropylene resin particles containing 0.05 to 2% by weight of an inorganic material such as aluminium hydroxide, calcium carbonate or the like, are used in the preparation of pre-expanded particles from polypropylene resin particles containing a volatile blowing agent or inorganic gas.

However, this method has problems from a viewpoint of environment and cost when a volatile blowing agent is used. Also, since carbonic acid gas among the inorganic gases is responsible for warming the earth, it is preferred not to use. Further, in case that gases other than carbonic acid gas among inorganic gases, such as nitrogen gas and air are used, nitrogen, air and the like insufficiently permeate into polyolefin polymer particles and have a rapid rate of releasing from the polyolefin polymer and, therefore, the method has the problem that an expanded article is difficult to be obtained and, even if obtained, at best 2 to 9 of expansion ratio is attained.

As one example of the methods for preparing polyolefin resin pre-expanded particles without the use of a volatile blowing agent, there has been proposed a method by holding a dispersion of crystalline polyolefin polymer particles containing 10 to 70% by weight of a filler based on the polymer in a disperse medium in a high pressure area under conditions of a pressure which is not lower than saturated vapor pressure of this dispersion and a temperature which is not higher than the melting point of the crystalline polymer and at which crystallization of the crystalline polymer proceeds, thereby permeating the disperse medium of the dispersion into the polymer particles by means of volumetric shrinkage associated with crystallization of the crystalline polymer, then injecting the thus obtained dispersion of expandable crystalline polymer particles from the high pressure area into a lower pressure area which is under conditions of a pressure not higher than the saturated vapor pressure of the dispersion and a temperature not higher than the melting point of the crystalline polymer, to give pre-expanded particles (Japanese Patent Publication Kokai No. 49-2183).

However, in this method, a filler must be included therein in an amount of 10 to 70% by weight based on the crystalline polyolefin polymer, and a molded article obtained by expanding such pre-expanded particles inevitably has lowered physical properties such as flexibility, cushioning characteristics and the like because it contains a large amount of the filler and, therefore, it can not be used for utility where higher level properties are required. In addition, this method has the problem that the filler prevents the particles from fusing together upon in-mold molding.

Further, there has been proposed a method for obtaining pre-expanded particles having an expansion ratio of not less than 5 without the use of a volatile blowing agent, by using as resin particles a propylene-ethylene random copolymer having an ethylene content of 1 to 12% by weight, applying a pressure to a dispersion by increasing the pressure in a sealed vessel to or above 5 kg/cm2G with an inorganic gas such as nitrogen or the like and, thereafter, maintaining the temperature of the dispersion at a temperature between the melting point of the resin particle and a temperature higher than the melting point by 25° C. (Japanese Patent Publication Kokai No. 60-221440).

However, when trying to obtain pre-expanded particles having a high expansion ratio by this method, it is required that the ethylene content in the propylene-ethylene random copolymer resin particle must be not less than 4% by weight and the temperature to be maintained is not lower than 160° C. or the time to maintain is not less than 10 hours. Pre-expanded particles obtained under such conditions are insufficient in mechanical strength and heat-resistance originally required for a polypropylene resin cellular molded article. In addition, when prepared at such a temperature to be held and such a time, not only agglomeration of particles is easy to occur but also productivity is low and, thus being not economical.

In general, in a case of polyolefin resin pre-expanded particles used for in-mold foaming, if the cell diameter is too small, a molded article obtained by molding the pre-expanded particles in a mold has the defects that it tends to have a large shrinkage rate and has a distorted shape (usually called sink or warpage in the art) thus decreasing the commercial value of molded article and adversely affecting the production techniques.

As pre-expanded particles from which a molded article having a small shrinkage rate after the in-mold foaming and having no distorted shape can be obtained, there has been proposed polyolef in resin pre-expanded particles comprising as a base resin a polyolefin resin into which a polymer having a carboxyl group is incorporated in an amount of 0.1 to 10 parts by weight based on 100 parts by weight of the polyolefin resin, and having a cell diameter of 200 to 500 $\mu$m (Japanese Patent Publication Kokai No. 62-115042). The polyolefin resin pre-expanded particles have, indeed, superior effects such that the shrinkage rate of a molded article after in-mold foaming is small and the shape of the molded article is not distorted. However, the use of a blowing agent is required for the preparation of the polyolefin resin pre-expanded particles and, therefore, the use of a blowing agent such as a volatile hydrocarbon or an inorganic gas raises problems as mentioned above.

Thus, an object of the present invention is to provide a method for preparing polyolef in resin pre-expanded particles having desired physical properties without the use of a volatile blowing agent such as hydrocarbon or an inorganic gas such as carbonic acid gas.

Another object of the present invention is to provide a polyolefin resin composition which can be suitably used for the preparation of polyolefin resin pre-expanded particles without the use of a volatile blowing agent.

A further object of the present invention is to provide polyolefin resin pre-expanded particles suitable as a raw material for in-mold foamed articles, without the use of a blowing agent which is not preferable from a viewpoint of environment and cost, such as volatile hydrocarbon or inorganic gas.

A still further object of the present invention is to provide polyolefin resin pre-expanded particles having a high expansion ratio which can provide cellular molded articles having excellent mechanical strength, heat resistance, water resistance, flexibility and cushioning properties.

Another object of the present invention is to provide a polyolefin resin cellular molded article obtained from these pre-expanded particles.

DISCLOSURE OF THE INVENTION

In view of the above-mentioned prior art, the present inventors extensively studied and, as a result, the inventors have found that pre-expanded particles can be obtained, without further impregnation with a blowing agent, by using a water-containing polyolefin resin composition wherein a hydrophilic polymer is incorporated into a polyolefin resin and water is contained therein at a water content of 1 to 50% by weight.

Thus, the present invention provides a water-containing polyolefin resin composition containing a polyolefin resin and a hydrophilic polymer and having a water content of 1 to 50% by weight.

Further, the present invention provides a polyolefin resin pre-expanded particle having an apparent expansion ratio of 5 to 60, a closed cell ratio of 80 to 100% and an average cell diameter of 50 to 500 μm, which is prepared by pre-expanding the above-mentioned water-containing polyolefin resin composition, and a polyolefin resin foam obtained by thermally molding the polyolefin resin pre-expanded particles.

In addition, the present invention provides a process for preparing polyolefin resin pre-expanded particles which comprises dispersing resin particles made of a polyolefin resin composition containing a polyolefin resin and a hydrophilic polymer into an aqueous dispersion medium in a closed vessel, heating the resin particles to a temperature of not less than the softening point of the polyolefin resin to give water-containing resin particles made of a water-containing polyolefin resin composition having a water content of 1 to 50% by weight, and releasing the water-containing resin particles and the aqueous dispersion medium from the closed vessel into an atmosphere of lower pressure than the inner pressure in the vessel, thereby expanding the water-containing resin particles.

In the above process, by maintaining the pressure in the closed vessel upon the release of the dispersion of resin particles from the closed vessel into the lower pressure atmosphere at a pressure above a certain pressure with an inorganic gas such as nitrogen and air which is not responsible for warming the earth, pre-expanded particles having a high expansion ratio and having desired physical properties can be easily prepared without increasing the amount of a filler or a hydrophilic polymer, whereby molded articles usable for purposes which require high level physical properties can be prepared at a low cost.

BEST MODE FOR CARRYING OUT THE INVENTION

The water-containing polyolefin resin composition of the present invention is a composition containing a polyolefin resin and a hydrophilic polymer, into which water is included to have a water content of 1 to 50% by weight.

The polyolefin resins used in the present invention are polymers containing 50 to 100% by weight, especially 70 to 100% by weight, of units of an olefin monomer and 0 to 50% by weight, especially 0 to 30% by weight, of units of a monomer copolymerizable with the olefin monomer. The polyolefin resins are light and are superior in mechanical strength, processability, electrical insulation, water resistance and chemical resistance. The units of the monomer copolymerizable with the olefin monomer are a component used for improving properties such as adhesion, transparency, impact resistance and gas barrier property, and it is preferable in obtaining effects produced by the use thereof that the content thereof is at least 2% by weight, especially at least 5% by weight.

Examples of the olefin monomer are α-olefin monomers having 2 to 8 carbon atoms such as ethylene, propylene, butene, pentene, hexene, heptene and octene, cyclic olefins such as norbornene monomers, and the like. Ethylene and propylene are preferred among them, since they are inexpensive and physical properties of the obtained polymers are good. The olefin monomers may be used alone or in admixture thereof.

Examples of the monomer copolymerizable with the olefin monomer are a vinyl ester such as vinyl acetate, an alkyl (meth)acrylate having a $C_1$ to $C_6$ alkyl group such as methyl methacrylate, ethyl acrylate or hexyl acrylate, vinyl alcohol, methacrylic acid, vinyl chloride, and the like. Among them, vinyl acetate is preferred from the viewpoints of adhesion, flexibility and low temperature characteristics, and methyl methacrylate is preferred from the viewpoints of adhesion, flexibility, low temperature characteristics and heat stability. These may be used alone or in admixture thereof.

For example, in case that the polyolefin resins are polypropylene resins, preferred are those having an MI of 0.5 to 30 g/10 minutes, especially 3 to 10 g/10 minutes, a modulus of flexural elasticity (JIS K 7203) of 5,000 to 20,000 kgf/cm², especially 8,000 to 16,000 kgf/cm², and a melting point of 125 to 165° C., especially 135 to 150° C. If the MI is less than 0.5 g/10 minutes, pre-expanded particles having a high expansion ratio are hard to be obtained since the melt viscosity is too high. If the MI is more than 30 g/10 minutes, cells are easy to be broken since the melt viscosity to elongation of the resin at the time of foaming is low, thus there is a tendency that pre-expanded particles having a high expansion ratio are hard to be obtained.

Examples of the polyolefin resin as mentioned above are, for instance, polypropylene resins such as an ethylene-propylene random copolymer, an ethylene-propylene-butene ramdom terpolymer, a polyethylene-polypropylene block copolymer and a propylene homopolymer, polyethylene resins such as a low density polyethylene, a medium density polyethylene, a high density polyethylene, a linear low density polyethylene, an ethylene-vinyl acetate copolymer and an ethylene-methyl methacrylate copolymer, a polybutene, polypentene, and the like. These polyolefin resins may be non-crosslinked ones, or may be crosslinked by means of peroxides or radiation Among them, polypropylene resins are preferred, since pre-expanded particles having a high expansion ratio are easy to be obtained as compared with other polyolefin resins, and since molded articles prepared from the obtained pre-expanded particles are good in mechanical strength and heat resistance. The polyolefin resins may be used alone or in admixture thereof.

The hydrophilic polymer mentioned above means polymers, the water absorption of which measured according to ASTM D570 is at least 0.5% by weight. It encompasses so-called hygroscopic polymers, water-absorptive polymers (polymers which absorb water in an amount of several to several hundreds times the weight of its own and are hard to be dehydrated even if a pressure is applied) and water-soluble polymers (polymers which are soluble in water at ordinary temperature or elevated temperatures). Such hydrophilic polymers contain hydrophilic groups, such as carboxyl group, hydroxyl group, amino group, amido group, ester group and polyoxyethylene group, in their molecules. The hydrophilic polymers may be used alone or in admixture thereof.

Representative examples of the hygroscopic polymers are, for instance, carboxyl group-containing polymers, polyamides, thermoplastic polyester elastomers, cellulose derivatives, and the like.

Examples of the caboxyl group-containing polymers are, for instance, ethylene-acrylic acid-maleic anhydride terpolymer (water absorption 0.5 to 0.7% by weight), ionomers wherein carboxyl groups of ethylene-(meth)acrylic acid copolymer are neutralized with an alkali metal ion such as sodium ion or potassium ion or a transition metal ion such as zinc ion to intermolecularly crosslink the copolymer (water absorption 0.7 to 1.4% by weight), ethylene-(meth) acrylic acid copolymer (water absorption 0.5% by weight), and the like. Examples of the polyamides are, for instance, nylon 6 (water absorption 1.3 to 1.9% by weight), nylon 66 (water absorption 1.5% by weight), copolymer nylons (e.g. product of EMS-CHEMIE AG, trade mark Griltex) (water absorption 1.5 to 3% by weight), and the like. Examples of the thermoplastic polyester elastomers are, for instance, block coplymers of polybutylene terephthalate and polytetramethylene glycol (water absorption 0.5% by weight), and the like. Examples of the cellulose derivatives are, for instance, cellulose acetate, cellulose propionate, and the like. These hygroscopic polymers may be used alone or in admixture thereof.

Among the hygroscopic polymers, ionomer resins are preferred, since they have an excellent dispersibility into polyolefin resins and a water-containing polyolefin resin composition having a high water content is obtained by the use in a relatively small amount. Any of known ionomer resins can be used, and ionomers undergoing ionic crosslinking with an alkali metal ion are particularly preferred.

Representative examples of the above-mentioned water-absorptive polymers are, for instance, starch-acrylic acid graft copolymers, crosslinked polyacrylic acid salt polymers such as a crosslinked sodium polyacrylate as represented by Aqualic (trade mark) made by Nippon Shokubai Co., Ltd. and Diawet (trade mark) made by Mitsubishi Chemical Corporation, crosslinked polyvinyl alcohol polymers as represented by Aquareserve GP (trade mark) made by Nippon Gohsei Kagaku Kogyo Kabushiki Kaisha, crosslinked polyethylene oxide polymers as represented by Aquacork (trade mark) made by Sumitomo Seika Chemicals, Limited, isobutylene-maleic acid copolymers as represented by KI Gel (trade mark) made by Kuraray Co., Ltd., and the like. These water-absorptive polymers may be used alone or in admixture thereof.

Among the water-absorptive polymers, crosslinked polyethylene oxides are preferable, since the dispersibility in polyolefin resins is good and a high water content is obtained by the use in a relatively small amount.

Representative examples of the above-mentioned water-soluble polymers are, for instance, poly(meth)acrylic acid polymers, poly(meth)acrylic acid salt polymers, polyvinyl alcohol polymers, polyethylene oxide polymers, water-soluble cellulose derivatives, and the like.

Examples of the poly(meth)acrylic acid polymers are, for instance, polyacrylic acid, acrylic acid-ethyl acrylate copolymer, poly-2-hydroxyethyl methacrylate, and the like. Examples of the poly(meth)acrylic acid salt polymers are, for instance, sodium polyacrylate, sodium polymethacrylate, potassium polyacrylate, potassium polymethacrylate, and the like. Examples of the polyvinyl alcohol polymers are, for instance, polyvinyl alcohol, vinyl alcohol-vinyl acetate copolymer, and the like. Examples of the polyethylene oxide polymers are, for instance, polyethylene oxide having tens of thousands to millions molecular weight, and the like. Examples of the water-soluble cellulose derivatives are, for instance, carboxymethyl cellulose, hydroxyethyl cellulose, and the like. These water-soluble polymers may be used alone or in admixture thereof.

The amount of the hydrophilic polymer varies depending on the kind of hydrophilic polymer. In general, in order to obtain a polyolefin resin composition having a predetermined water content, it is preferable to use the hydrophilic polymer in an amount of at least 0.05 part by weight, especially at least 0.5 part by weight, per 100 parts by weight of the polyolefin resin. Also, from the viewpoints of good production stability and foaming characteristics in the preparation of pre-expanded particles imparting excellent mechanical strength and heat resistance to molded articles obtained from the pre-expanded particles and decreasing the dimensional change of molded articles upon absorption of water, it is preferable that the amount of the hydrophilic polymer is at most 30 parts by weight, especially at most 20 parts by weight, more especially at most 10 parts by weight, per 100 parts by weight of the polyolefin resin.

Preferably, a filler is incorporated into the above-mentioned polyolefin resin composition containing polyolefin resin and hydrophilic polymer, since pre-expanded particles having uniform cells and having a high expansion ratio can be obtained.

The average particle size of the filler is preferably at most 50 $\mu$m, especially at most 10 $\mu$m, from the viewpoints that pre-expanded particles having uniform cells and having a high expansion ratio can be obtained and molded articles excellent in mechanical strength, flexibility and the like can be obtained from the pre-expanded particles, and is preferably at least 0.1 $\mu$m, especially at least 0.5 $\mu$m, from the viewpoints of secondary agglomeration and handling workablility.

Any of inorganic fillers and organic fillers can be used as the filler.

Examples of the inorganic fillers are, for instance, talc, calcium carbonate, calcium hydroxide, and the like. Talc is preferred among the inorganic fillers, since pre-expanded particles having uniform cells and having a high expansion ratio can be obtained.

The organic fillers are not particularly limited so long as they are solid at a temperature not less than the softening point of the polyolefin resin. Examples thereof are, for instance, fluororesin powder, silicone resin powder, thermoplastic polyester resin powder, and the like.

The fillers may be used alone or in admixture thereof.

In order to obtain pre-expanded particles having a high expansion ratio, it is preferable that the amount of the filler used is not less than 0.01 part by weight, especially not less than 0.1 part by weight, per 100 parts by weight of the polyolefin resin. Also, in order to obtain a molded article having excellent mechanical strength and flexibility from the pre-expanded particles by causing to exhibit excellent fusing properties upon molding the pre-expanded particles, the filler should be used in an amount of not more than 10 parts by weight, preferably not more than 5 parts by weight, more preferably not more than 3 parts by weight, particularly preferably not more than 2 parts by weight, per 100 parts by weight of the polyolefin resin.

In the present invention, the polyolefin resin composition containing the polyolefin resin and the hydrophilic polymer and optionally the filler is melt-kneaded usually using an extruder, a kneader, Banbury mixer and a roll, and then formed into resin particles having a desired shape which is easy to adopt to pre-expansion, such as cylindrical, ellipsoidal, spherical, cubic and rectangular parallelepipedic shapes. The conditions for the preparation of the resin particles and the size of the resin particles are not limited to specified ones. For example, the polyolefin resin composition is, in general, melt-kneaded in an extruder to prepare particles of 0.5 to 5 mg/particle.

The water-containing polyolefin resin composition is obtained by including water into the polyolefin resin composition The water content in the water-containing polyolefin resin composition is adjusted to 1 to 50% by weight. In a preferable embodiment, the inclusion of water into the polyolefin resin composition is performed, in a pre-expanding step, by dispersing the resin particles into an aqueous dispersion medium in a closed vessel and heating the resin particles to a temperature of not lower than the softening point of the polyolefin resin. The water content in the water-containing polyolefin resin composition can be adjusted by adjusting the heating temperature and heating time. If the water content of the water-containing polyolefin resin composition is less than 1% by weight, the apparent expansion ratio tends to be less than 5. Therefore, the water content is not less than 1% by weight, especially not less than 3% by weight, more especially not less than 5% by weight. On the other hand, if the water content exceeds 50% by weight, the dispersibility of the resin particles into the aqueous dispersion medium is lowered and, thereby, the resin particles tend to form masses in the closed vessel upon preparation of the pre-expanded particles so that uniform pre-expansion can not be effected. Therefore, the water content is not more than 50% by weight, especially not more than 30% by weight.

The "water content" of the water-containing polyolefin resin composition refers to a value obtained by determining the weight of the water-containing resin particles of the polyolefin resin composition (weight of water-containing resin X) after water attached to the surface thereof has been removed, determining the weight (weight of dry resin Y) after the particles have been dried for 3 hours in an oven set at a temperature 20° C. higher than the melting point of the resin and cooled to room temperature in a desiccator, and then calculating according to the equation (1).

$$\text{Water content (\% by weight)} = \frac{X - Y}{Y} \times 100 \qquad (1)$$

In case that the resin particles contain a filler and the like, the value obtained by subtracting the weight of the filler from that of the resin particles is regarded as the weight of the resin particles.

Pre-expanded particles of a polyolefin resin are prepared by dispersing the resin particles made of the polyolefin resin composition into an aqueous dispersion medium in a closed vessel, heating the resin particles to a temperature of not less than the softening point of the polyolefin resin to give water-containing resin particles having a water content of 1 to 50% by weight, opening an end of the closed vessel and releasing the water-containing resin particles and the aqueous dispersion medium into an atmosphere of lower pressure than the innner pressure of the vessel, thereby expanding the water-containing resin particles.

The aqueous dispersion medium is typically water, and may be a mixture of water with a solvent which cannot dissolve the polyolefin resin, such as ethylene glycol, methyl alcohol, ethyl alcohol or glycerol. Water is preferred from environmental and economical points of view.

The aqueous dispersion medium may contain a dispersing agent. Examples of the dispersing agent are, for instance, calcium tertiary phosphate. basic magnesium carbonate, basic zinc carbonate, calcium carbonate, a surface active agent such as sodium dodecylbenzene-sulfonate, sodium n-paraffinsulfonate or sodium α-olefin-sulfonate, and the like.

The amount of the resin particles to be dispersed into the aqueous dispersion medium is preferably from 3 to 100 parts by weight, more preferably from 10 to 50 parts by weight, per 100 parts by weight of the aqueous dispersion medium. If the amount of the resin particles is less than 3 parts by weight, the productivity is lowered, thus being uneconomical. If the amount is more than 100 parts by weight, the resin particles tend to be fused together in the vessel during heating.

The dispersion of the resin particles is heated to a temperature not lower than the softening point of the polyolefin resin used. For example, in case of an ethylene-propylene copolymer having a melting point of 145° C., preferably the heating is conducted at a temperature of 145 to 165° C., especially 150 to 160° C. If the temperature is less than 145° C., expansion becomes difficult, and if the temperature exceeds 160° C., the mechanical strength and heat resistance of obtained foams are insufficient and the resin particles are easy to fuse together in the vessel.

The water content of the resin particles can be adjusted to 1 to 50% by weight by dispersing the specific resin particles into an aqueous dispersion medium and heaing it in such a manner, and stirring for 30 minutes to 12 hours. The control of the water content can be conducted by controlling the heating temperature, the heating time and the like. The water absorption is shown by a value measured at ordinary temperature and, for example, if the water absorption of a hydrophilic polymer used is not less than 0.5%, a water content of not less than 1% can be attained, since the water impregnation treatment is conducted at a high temperature.

After the resin particles are dispersed into an aqueous medium and heated to give water-containing resin particles, the dispersion is released to an atmosphere of lower pressure than the pressure in the closed vessel, usually atmospheric pressure, to expand the resin particles, whereby pre-expanded particles of the polyolefin resin are obtained. In order to smoothly conduct the release of the dispersion, the release may be conducted under pressure by introducing a nitrogen gas or the like into the closed vessel.

The thus obtained polyolefin resin pre-expanded particles have an apparent expansion ratio of 5 to 60, a closed cell ratio of 80 to 100% and an average cell diameter of 50 to 500 $\mu$m.

If the apparent expansion ratio is less than 5, the flexibility and cushioning properties of a molded article obtained from the pre-expanded particles become insufficient. On the other hand, if the apparent expansion ratio exceeds 60, the mechanical strength and heat resistance of a molded article obtained from the pre-expanded particles become insufficient. Also, if the closed cell ratio is less than 80%, the pre-expanded particles lack the secondary expanding force, thus fusing failure occurs upon molding to deteriorate the mechanical strength and the like of the resultant molded article. If the average cell diameter is less than 50 $\mu$m, there arises a problem that the shape of molded article obtained from the pre-expanded particles is distorted. On the other hand, if the average cell diameter exceeds 500 $\mu$m, the mechanical strength of molded article obtained from the pre-expanded particles is lowered.

Molding of the polyolefin resin pre-expanded particles of the present invention to foams can be carried out by known methods. For example, after optionally impregnating the pre-expanded particles with air by treating the pre-expanded particles in a pressure vessel for a predetermined period of time under heating and pressure, the pre-expanded particles are filled in a mold and subjected to thermal foaming by steam heating to give a cellular molded article. In that case, since the closed cell ratio of the pre-expanded particles is as high as 80% or more, a cellular molded article having a shape corresponding to that of the mold is obtained.

The thus obtained cellular molded article has excellent mechanical strength, heat resistance and water resistance, and also has a small dimensional shrinkage and a small shape deformation, thus having an extremely high commodity value.

In case of uses, such as cushioning material, which require high degree of flexibility and cushioning properties, pre-expended particles are usually required to have an apparent expansion ratio of not less than 20. Such a high expansion ratio is achieved by increasing the amount of a filler or a hydrophilic polymer. However, as mentioned above, if the filler is used in an amount of more than 10 parts by weight or the hydrophilic polymer is used in an amount of more than 30 parts by weight per 100 parts by weight of the polyolefin resin, a molded article obtained from the pre-expanded particles has inevitably lowered physical properties such as mechanical strength, heat resistance and water resistance and, therefore, the molded article cannot be used for uses which require high level properties.

The present inventors have found that if the pressure in a closed vessel upon releasing the resin particles impregnated with an aqueous dispersion medium from the closed vessel to a lower pressure atmosphere is maintained above a certain pressure with an inorganic gas such as nitrogen, air or the like which is not responsible for warming the earth, pre-expanded particles having a high expansion ratio and having desired physical properties can be prepared even if the amount of a filler or a hydrophilic polymer is made small, whereby molded articles having excellent mechanical strength, heat resistance, water resistance, flexibility and cushioning properties which can be used for purposes requiring physical properties of high level, can be prepared at a low production cost.

Thus, the present invention also provides a process for preparing pre-expanded particles of a polyolefin resin which comprises dispersing resin particles made of a polyolefin resin composition containing a polyolefin resin and 0.05 to 20 parts by weight of a hydrophilic polymer per 100 parts by weight of the polyolefin resin into an aqueous dispersion medium in a closed vessel, heating the resin particles to a temperature of not lower than the softening point of the polyolefin resin to give water-containing resin particles having a water content of 1 to 50% by weight, introducing a nitrogen gas, air or an inorganic gas containing nitrogen gas or air as a main component into the closed vessel to raise the pressure in the closed vessel to 25 to 75 kg/cm$^2$G, and releasing the dispersion of the resin particles into an atmosphere of lower pressure than the pressure in the closed vessel while maintaining that pressure, thereby expanding the water-containing resin particles.

As the inorganic gas containing nitrogen gas or air as a main component, there can be used inorganic gases containing a nitrogen gas and/or air as a main component (usually in an amount of not less than 50% by volume, especially not less than 70% by weight) and a minor amount (not more than 50% by volume, especially not more than 30% by volume) of an inert gas such as argon, helium or xenon, steam, oxygen, hydrogen or ozone. Preferable inorganic gases are a nitrogen gas, air and a mixture thereof from the viewpoints of cost, productivity, safety, environmental suitability and the like.

The pressure in the closed vessel to be held by the inorganic gas is from 25 to 75 kg/cm$^2$G, preferably 30 to 70 kg/cm$^2$G. If the internal pressure is less than 25 kg/cm$^2$G, pre-expanded particles having a high expansion ratio are not obtained. If the internal pressure exceeds 75 kg/cm$^2$G, the cell diameter becomes too small and the closed cell ratio is lowered, thus deteriorating shrinking resistance, shape stability, mechanical strength and heat resistance of molded articles.

The time from reaching a predetermined pressure by pressurizing with an inorganic gas up to release of the water-containing resin particles together with the aqueous dispersion medium into a lower pressure atmosphere is not particularly limited, but that time is preferably as short as possible from the viewpoint of improvement in productivity. In addition, the pressure in the vessel during the release is preferably held at the above-mentioned pressure reached.

Polyolefin resin pre-expanded particles having an apparent expansion ratio of 20 to 60, a closed cell ratio of 80 to 100% and an average cell diameter of 50 to 500 $\mu$m can be easily obtained by such a process without deteriorating physical properties. These pre-expanded particles are suited for the production of foams having high degrees of flexibility and cushioning property usable as cushioning material and the like.

The present invention is explained by means of examples and comparative examples, in which all parts are by weight unless otherwise noted. It is to be understood that the present invention is not limited to these examples.

The characteristics shown in examples and comparative examples were measured by the following methods.

(Apparent Expansion Ratio)

The obtained pre-expanded particles were placed gently in a beaker of 1 liter internal volume in such an amount to be leveled after, and were leveled at the top of beaker with a plate without applying vibration, and the weight of the pre-expanded particles in the beaker was weighed to calculate an apparent density.

The density of pellets of a resin composition (resin particles) used for obtaining the pre-expanded particles was divided by the apparent density to obtain an value which was adopted as apparent expansion ratio.

(Closed Cell Ratio)

The volume of closed cells of the obtained pre-expanded particles was obtained by using an air-comparing type specific gravity meter (manufactured by Beckman, Model 930), and the closed cell ratio was calculated by dividing the resulting closed cell volume by the apparent volume which had been obtained separately by a submerging method.

(Average Cell Diameter)

Thirty pre-expanded particles were collected randomly from the obtained pre-expanded particles, and the cell diameter was measured according to JIS K 6402, to calculate the average cell diameter.

(Variation in Cells)

The ratio of standard deviation ($\sigma$) representing variation in cell diameter to average cell diameter (d) (hereinafter referred to as "U"):

$$U=(\sigma/d)\times 100(\%)$$

was obtained, and the variation in cells was evaluated according to the following criteria The smaller the U value, the cells are more uniform.

○: U value is less than 35%.

Δ: U value is 35 to 45%.

X: U value exceeds 45%.

(Mechanical Strength)

A molded article was prepared from the obtained pre-expanded particles. Specific compressive strength P (kg/cm$^2$) was calculated by dividing a compressive strength (kg/cm$^2$) at 50% compressive strain obtained according to NDS Z 0504 by the specific gravity of the molded article. The mechanical strength was evaluated according to the following criteria ○: P value exceeds 50 kg/cm$^2$.

Δ: P value is 30 to 50 kg/cm$^2$.

X: P value is less than 30 kg/cm$^2$.

(Heat Resistance)

A molded article was prepared from the obtained pre-expanded particles and thermal dimensional change rate S(%) was calculated according to JIS K 6767 except that a temperature of 110° C. was used. The heat resistance was evaluated according to the following criteria.

○: S value is less than 5%.

Δ: S value is 5 to 15%.

X: S value exceeds 15%.

(Water Resistance)

A molded article was prepared from the obtained pre-expanded particles and water absorption Qv (g/cm$^3$) was calculated according to JIS K 6767, method B. The water resistance was evaluated according to the following criteria.

○: Qv value is less than 0.02 g/cm$^3$.

Δ: Qv value is 0.02 to 0.05 g/cm$^3$.

X: Qv value exceeds 0.05 g/cm$^3$.

(Flexibility)

A molded article was prepared from the obtained pre-expanded particles and tensile elongation $\epsilon$(%) was calculated according to JIS K 6767. The flexibility was evaluated according to the following criteria.

○: $\epsilon$ value exceeds 15%.

Δ: $\epsilon$ value is 5 to 15%.

X: $\epsilon$ value is less than 5%.

(Cushioning Property)

A molded article was prepared from the obtained pre-expanded particles and cushion factor C. and maximum stress $\delta_{max}$ (kg/cm$^2$) were calculated according to JIS Z 0235. The cushioning property was evaluated according to the following criteria ○: C value is less than 3 and $\delta_{max}$ value is less than 4 kg/cm$^2$.

Δ: C value is less than 3 or $\delta_{max}$ value is less than 4 kg/cm$^2$.

X: C value is not less than 3 and $\delta_{max}$ value is not less than 4 kg/cm$^2$.

EXAMPLES 1 TO 7 AND COMPARATIVE EXAMPLES 1 TO 3

A polyolefin resin comopsition were prepared by mixing 100 parts of a polyolefin resin (ethylene-propylene random copolymer, ethylene content 3.1% by weight, melting point 145° C., MI 6.0 g/10 min., modulus of flexural elasticity 10,000 kgf/cm$^2$) with a hydrophilic polymer and a filler (talc, average particle size 9.5 μm) of the amounts indicated in Table 1, and pellets (resin particles, 5 mg/particle) were prepared therefrom.

As the hydrophilic polymer, an ionomer in which an ethylene-acrylic acid copolymer was intermolecularly cross-linked with sodium ion was used in Examples 1 to 6 and Comparative Examples 1 and 2, a cross-linked polyethylene oxide polymer (made by Sumitomo Seika Chemicals Company, Limited, trade mark: Aquacork T) was used in Example 7, and 5 parts of an ethylene-vinyl acetate copolymer (made by Sumitomo Chemical Company, Limited, trade mark: Evatate K3010, vinyl acetate content 28% by weight) was used instead of the hydrophilic polymer in Comparative Example 3.

Then, 100 parts of the pellets, 0.5 part of powdery basic calcium tertiary phosphate as a dispersing agent, 0.006 part of sodium n-paraffinsulfonate were placed in a sealed vessel together with 300 parts of water, followed by heating to 155° C. At that time, the pressure was about 5.6 kg/cm$^2$G. About 20 g of pellets containing water (water-containing resin particles) were taken from the sealed vessel and placed in a wire mesh vessel. Pressurized air was blown thereto to remove water attached to the surface of the pellets, and the weight of the pellets (X) was obtained. Then, the pellets were dried in an oven at 165° C. for 3 hours and cooled to room temperature in a desiccator and, thereafter, the weight of the dried pellets (Y) as obtained. The water content of the water-containing resin particles was obtained according to the above equation (I). The results thereof are shown in Table 1.

Thereafter, while holding the pressure in the vessel at 20 kg/cm$^2$ G by introducing nitrogen gas into the vessel, a valve provided at a lower part of the sealed vessel was opened to release the aqueous dispersion (water-containing resin particles and aqueous dispersion medium) into atmospheric pressure to effect pre-expansion. The apparent expansion ratio, closed cell ratio, average cell diameter and variation in cells of the resulting pre-expanded particles were determined. The results thereof are shown in Table 1.

TABLE 1

| | Composition of polyolefin resin composition (part) | | | Water content of water-containing polyolefin resin composition (% by weight) | Properties of pre-expanded particles | | | |
|---|---|---|---|---|---|---|---|---|
| Ex. No. | Polyolefin resin | Hydrophilic polymer | Filler | | Apparent expansion ratio | Closed cell ratio (%) | Average cell diameter ($\mu$m) | Variation in cells |
| 1 | 100 | 5 | 1 | 4.7 | 15 | 97 | 200 | ○ |
| 2 | 100 | 5 | 0 | 4.6 | 6 | 98 | 300 | ○ |
| 3 | 100 | 5 | 5 | 4.8 | 21 | 93 | 200 | ○ |
| 4 | 100 | 5 | 10 | 5.0 | 23 | 86 | 150 | ○ |
| 5 | 100 | 2 | 1 | 2.2 | 8 | 99 | 200 | ○ |
| 6 | 100 | 25 | 1 | 24.2 | 54 | 90 | 400 | ○ |
| 7 | 100 | 5 | 0 | 4.2 | 13 | 94 | 300 | ○ |
| Com Ex. 1 | 100 | 0 | 0 | 0.3 | 2 | 98 | 200 | x |
| Com Ex. 2 | 100 | 0 | 1 | 0.4 | 3 | 97 | 150 | Δ |
| Com Ex. 3 | 100 | 0 | 0 | 0.5 | 3 | 96 | 200 | x |

From the results shown in Table 1, it is found that the pre-expanded particles obtained in Examples 1 to 7 have a high expansion ratio, uniform fine cells and a high closed cell ratio.

EXAMPLES 8 TO 15 AND COMPARATIVE EXAMPLES 4 TO 8

A polyolefin resin comopsition was prepared by mixing 100 parts of a polyolefin resin (ethylene-propylene random copolymer, ethylene content 3.1% by weight, melting point 145° C., MI 6.0 g/10 min., modulus of flexural elasticity 10,000 kgf/cm$^2$) with a hydrophilic polymer and a filler (talc, average particle size 9.5 $\mu$m) of the amounts indicated in Table 1, and pellets (resin particles, 5 mg/particle) were prepared therefrom.

As the hydrophilic polymer, an ionomer (water absorption 1% by weight) in which an ethylene-acrylic acid copolymer was intermolecularly crosslinked with sodium ion was used in Examples 8 to 13 and 15 and Comparative Examples 4 to 7, a crosslinked polyethylene oxide polymer (made by Sumitomo Seika Chemicals Company, Limited, trade mark: Aquacork T) was used in Example 14, and 5 parts of an ethylene-vinyl acetate copolymer (made by Sumitomo Chemical Company, Limited, trade mark: Evatate K3010, vinyl acetate content 28% by weight) was used in stead of the hydrophilic polymer in Comparative Example 8.

Then, 100 parts of the pellets, 0.5 part of powdery basic calcium tertiary phosphate as a dispersing agent, 0.006 part of sodium n-paraffinsulfonate were placed in a sealed vessel together with 300 parts of water, followed by heating to 155° C. over about 90 minutes. The resulting dispersion was further maintained at that temperature for 15 minutes. At that time, the pressure was about 5.6 kg/cm$^2$G.

About 20 g of pellets containing water (water-containing resin particles) were taken from the sealed vessel and placed in a wire mesh vessel. Pressurized air was blown thereto to remove water attached to the surface of the pellets, and the weight of the pellets (X) was obtained. Then, the pellets were dried in an oven at 165° C. for 3 hours and cooled to room temperature in a desiccator and, thereafter, the weight of the dried pellets (Y) was obtained. The water content of the water-containing resin particles was obtained according to the above equation (1). The results thereof are shown in Table 2.

Thereafter, the pressure in the sealed vessel was raised to the pressure shown in Table 2 by introducing nitrogen gas into the vessel, and a valve provided at a lower part of the sealed vessel was immediately opened to release, while keeping that pressure, the aqueous dispersion (water-containing resin particles and aqueous dispersion medium) into atmospheric pressure to effect pre-expansion.

The apparent expansion ratio, closed cell ratio, average cell diameter and variation in cells of the resulting pre-expanded particles were determined. The results thereof are shown in Table 2.

TABLE 2

| | Composition of polyolefin resin composition (part) | | | Water content of water-containing polyolefin resin composition (% by weight) | Pressure kept (kg/cm$^2$G) |
|---|---|---|---|---|---|
| Ex. No. | Polyolefin resin | Hydrophilic polymer | Filler | | |
| 8 | 100 | 5 | 1 | 4.7 | 30 |
| 9 | 100 | 5 | 1 | 4.7 | 50 |
| 10 | 100 | 5 | 1 | 4.7 | 70 |
| 11 | 100 | 5 | 0 | 4.6 | 50 |
| 12 | 100 | 2 | 1 | 2.2 | 50 |
| 13 | 100 | 10 | 1 | 8.7 | 50 |
| 14 | 100 | 5 | 0 | 4.2 | 50 |
| 15 | 100 | 10 | 2 | 8.8 | 70 |
| Com. Ex. 4 | 100 | 0 | 0 | 0.3 | 50 |
| Com. Ex. 5 | 100 | 0 | 1 | 0.4 | 50 |
| Com. Ex. 6 | 100 | 5 | 1 | 4.7 | 20 |

TABLE 2-continued

| | | | | | |
|---|---|---|---|---|---|
| Com. Ex. 7 | 100 | 5 | 1 | 4.7 | 80 |
| Com. Ex. 8 | 100 | 0 | 0 | 0.5 | 50 |

| | Properties of pre-expanded particles | | | | Physical properties of molded articles | | | | |
|---|---|---|---|---|---|---|---|---|---|
| Ex. No. | Apparent expansion ratio | Closed cell ratio (%) | Average cell diameter (μm) | Variation in cells | Mechanical strength | Heat resistance | Water resistance | Flexibility | Cushioning property |
| 8 | 22 | 96 | 200 | ○ | ○ | ○ | ○ | ○ | ○ |
| 9 | 30 | 94 | 170 | ○ | ○ | ○ | ○ | ○ | ○ |
| 10 | 35 | 81 | 100 | ○ | ○ | ○ | ○ | ○ | ○ |
| 11 | 21 | 95 | 200 | ○ | ○ | ○ | ○ | ○ | ○ |
| 12 | 20 | 97 | 170 | ○ | ○ | ○ | ○ | ○ | ○ |
| 13 | 35 | 88 | 150 | ○ | ○ | ○ | ○ | ○ | ○ |
| 14 | 21 | 94 | 250 | ○ | ○ | ○ | ○ | ○ | ○ |
| 15 | 49 | 80 | 100 | ○ | ○ | ○ | ○ | ○ | ○ |
| Com. Ex. 4 | 6 | 94 | 170 | x | ○ | ○ | ○ | x | x |
| Com. Ex. 5 | 8 | 93 | 120 | Δ | ○ | ○ | ○ | x | x |
| Com. Ex. 6 | 15 | 97 | 200 | ○ | ○ | ○ | ○ | Δ | Δ |
| Com. Ex. 7 | 18 | 63 | 20 | ○ | ○ | ○ | ○ | Δ | Δ |
| Com. Ex. 8 | 8 | 92 | 170 | x | ○ | ○ | ○ | x | x |

From the results shown in Table 2, it is found that the pre-expanded particles obtained in Examples 8 to 15 have a high expansion ratio (apparent expansion ratio of not less than 20), uniform fine cells and a high closed cell ratio, in spite of small contents of the hydrophilic polymer and the filler. In addition, it is found that molded articles obtained by using these pre-expanded particles have excellent flexibility and cushioning properties and have no lowered mechanical strength, heat resistance and water resistance.

INDUSTRIAL APPLICABILITY

According to the present invention, there can be obtained polyolefin resin pre-expanded particles having excellent properties such as an apparent expansion ratio of 5 to 60, a closed cell ratio of 80 to 100% and an average cell diameter of 50 to 500 μm without the use of a volatile blowing agent having problems in safety, cost and environmental pollution and without the use of carbonic acid gas having a problem in respect of warming the earth.

Molded articles obtained by in-mold foaming from the pre-expanded particles of the present invention have a small shrinkage and a small distortion and, therefore, have good appearance, and also they have no problem of distortion, thus productivity is improved. Further, according to the present invention, pre-expanded particles having a high expansion ratio can be obtained without lowering mechanical strength, heat resistance and water resistance, and molded articles obtained from such pre-expanded particles having a high expansion ratio have excellent flexibility and cushioning properties in addition to the above-mentioned properties. Accordingly, the pre-expanded particles of the present invention can be suitably used for structure materials such as an impact absorbing material for vehicles which require dimensional accuracy, and heat insulating building materials, and are also useful for uses such as cushioning packaging material.

What is claimed is:

1. A process for preparing pre-expanded particles of a polyolefin resin without using a volatile blowing agent comprising dispersing resin particles made of a polyolefin resin composition comprising a polyolefin resin, 0.5 to 10 parts by weight of a hydrophilic polymer per 100 parts by weight of said polyolefin resin and 0.01 to 10 parts by weight of a filler per 100 parts by weight of said polyolefin resin into an aqueous dispersion medium in a closed vessel to form a dispersion, subsequently heating said dispersion to a temperature not lower than the softening point of said polyolefin resin to produce water-containing resin particles having a water content of 1 to 50% by weight based on the weight of said polyolefin resin composition from which the weight of said filler is subtracted, introducing nitrogen gas, air, or an inorganic gas containing nitrogen gas or air as a main component into said closed vessel to raise the pressure in said closed vessel to 25 to 75 kg/cm$^2$G, and releasing said dispersion from said closed vessel into a lower pressure than the inner pressure of said closed vessel, thereby expanding said water-containing resin particles.

2. The process of claim 1, wherein said polyolefin resin composition contains a filler in an amount of at most, 3 parts by weight per 100 parts by weight of said polyolefin resin.

3. The process of claim 1, wherein said filler comprises talc.

4. The process of claim 1, wherein said polyolefin resin comprises a polypropylene resin.

5. The process of claim 1, wherein said hydrophilic polymer is at least one member selected from the group consisting of a hygroscopic polymer, a water absorptive polymer and a water-soluble polymer.

6. The process of claim 1, wherein said hydrophilic polymer is selected from the group consisting of a carboxyl group containing polymer, a polyamide, a thermoplastic polyester elastomer, a cellulose derivative, a crosslinked polyacrylic acid salt polymer, a starch-acrylic acid graft copolymer, a crosslinked polyvinyl alcohol polymer, a crosslinked polyethylene oxide polymer, an isobutylene-maleic acid copolymer, a poly(meth)acrylic acid polymer, a poly(meth)acrylic acid salt polymer, a water-soluble polyvinyl alcohol polymer, a water-soluble polyethylene oxide polymer, and a water-soluble cellulose derivative.

7. The process of claim 6, wherein said carboxyl group-containing polymer comprises an ionomer resin in which an ethylene-(meth)acrylic acid copolymer is intermolecularly crosslinked with a metal ion.

8. The process of claim 1, wherein said releasing is carried out while maintaining the inner pressure of said closed vessel.

9. The process of claim 1, wherein said releasing is started immediately after the pressure in said closed vessel reaches 25 to 75 kg/cm$^2$G.

10. A process for preparing pre-expanded particles of a polyolefin resin without using a volatile blowing agent comprising dispersing resin particles made of a polyolefin resin composition comprising a polyolefin resin, 0.5 to 10 parts by weight of a hydrophilic polymer per 100 parts by weight of said polyolefin resin and 0.01 to 10 parts by weight of a filler per 100 parts by weight of said polyolefin resin into an aqueous dispersion medium in a closed vessel to form a dispersion, subsequently heating said dispersion to a temperature not lower than the softening point of said polyolefin resin to produce water-containing resin particles having a water content of 1 to 50% by weight based on the weight of said polyolefin resin composition from which the weight of said filler is subtracted, and releasing said dispersion from said closed vessel into a lower pressure than the inner pressure of said closed vessel, thereby expanding said water-containing resin particles.

11. The process of claim 10, wherein said polyolefin resin composition contains 0.1 to 5 parts by weight of a filler per 100 parts by weight of said polyolefin resin.

12. A process for preparing pre-expanded particles of a polyolefin resin without using a volatile blowing agent comprising dispersing resin particles made of a polyolefin resin composition comprising a polyolefin resin, 0.5 to 10 parts by weight of a hydrophilic polymer per 100 parts by weight of said polyolefin resin and 0.01 to 10 parts by weight of a filler per 100 parts by weight of said polyolefin resin into an aqueous dispersion medium in a closed vessel to form a dispersion, heating said dispersion to a temperature not lower than the softening point of said polyolefin resin to produce water-containing resin particles having a water content of 1 to 50% by weight based on the weight of said polyolefin resin composition from which the weight of said filler is subtracted, and releasing said dispersion from said closed vessel into a lower pressure than the inner pressure of said closed vessel while maintaining the inner pressure of said closed vessel, thereby expanding said water-containing resin particles.

* * * * *